UNITED STATES PATENT OFFICE.

EDUARD POLAK, OF GRONINGEN, NETHERLANDS.

METHOD OF MAKING PUDDING COMPOSITIONS.

1,426,006. Specification of Letters Patent. Patented Aug. 15, 1922.

No Drawing. Application filed July 21, 1920. Serial No. 397,987.

*To all whom it may concern:*

Be it known that I, EDUARD POLAK, a subject of the Queen of the Netherlands, and a resident of Groningen, Netherlands, have invented new and useful Improvements in a Method of Making Pudding Compositions (for which I have filed application for patent in Germany, April 1, 1919), of which the following is a specification.

This invention relates to an improved method of making pudding compositions. The object of the invention is to obviate the drawbacks of the present methods of making such compositions in the form of pudding-powders. The usual manner of preparing the pudding from the prepared pudding powder consists in stirring the powder with a liquid for instance water, milk or the like, and heating the mixture. But even by careful mixing the powder with the liquid, the formation of lumps cannot be prevented. The resulting pudding is not uniform. Moreover, most of the pudding-powders are hygroscopic and contain the packings already in small lumps which render their solution in liquid very difficult, or even impossible.

It is the object of the present invention to obviate these disadvantages. According to the invention the pudding powder after having been completely prepared is put into a bath of molten sugar which has been completely freed from moisture; the mixture is then stirred and heated until the moisture contained in the pudding-powder has been entirely removed. The plastic mass thus obtained is pressed into the form of tablets or the like. These pudding tablets dissolve readily and completely in water or in any liquid; the formation of lumps is prevented, and a uniform pudding is obtained.

The improved method may be carried out in the following manner:—

A certain quantity of sugar is brought to boiling point and is preferably entirely freed from moisture by a suitable heating. Into this sugar bath is stirred the ready made pudding powder and is dissolved therein and further heated. Owing to the high temperature of the sugar bath and the further heating, the mixture is entirely freed from any moisture contained therein. At the same time all the components of the pudding powder are sterilized. After entire removal of the water there remains a coherent and slightly sticky mass which is pressed into the form of tablets or other solid form. These tablets are preserved in their sterilized condition by employing a machine, which automatically wraps up and packs the tablets into suitable packages. It should be mentioned that whilst in the ordinary manufacture of pudding powders at least 3% are lost in the form of dust, any loss of this kind is entirely avoided by my improved method.

A further advantage of the invention consists in the pudding tablets being easily transported and having a more pronounced flavor than the ordinary loose pudding powders. They also retain their flavor much better than in powder form. The tablets produced by the improved method can be kept a very long time, and ingredients may be used in the making of such tablets which cannot otherwise be easily preserved. It is possible to also use various ingredients which cannot be employed in the making up of ordinary pudding powders.

An essential feature of the invention consists in continuing the heating and carrying the same to such a degree as to remove all moisture from the pudding powder and the sugar. A specific example of making pudding tablets according to the present invention is the following:—

200 kg. of sugar are melted and heated until the water is entirely evaporated. The pudding powder consisting for instance of 160 kg. of farina, 10 kg. of corn meal, 20 kg. tapioca and 40 kg. ground almonds is added and the mass is stirred for about ten minutes, the temperature being raised to about 110° Celsius in order to obtain the complete evaporation of the moisture contained in the mixture. The mass is then cooled, put into a suitable press and made into the form of tablets.

What is claimed is:—

Method of making pudding compositions consisting in heating a bath of molten sugar to evaporate the water contents thereof, adding the ready pudding powder, heating the mixture until complete evaporation of the moisture contained therein, and pressing the mass into the solid form of tablets and the like.

In witness whereof I affix my signature.

EDUARD POLAK.

Witnesses:
W. PHENN,
J. G. HAUDENDYK.